United States Patent
Cai et al.

(10) Patent No.: US 10,931,601 B2
(45) Date of Patent: Feb. 23, 2021

(54) METHOD AND APPARATUS FOR CONDITIONAL BROADCASTING OF NETWORK CONFIGURATION DATA

(71) Applicant: Alibaba Group Holding Limited, Grand Cayman (KY)

(72) Inventors: Dezhong Cai, Hangzhou (CN); Yongqing Xi, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 15 days.

(21) Appl. No.: 16/024,128

(22) Filed: Jun. 29, 2018

(65) Prior Publication Data

US 2019/0044887 A1    Feb. 7, 2019

(30) Foreign Application Priority Data

Aug. 1, 2017    (CN) .......................... 201710648822.4

(51) Int. Cl.
| | | |
|---|---|---|
| *H04L 12/937* | (2013.01) | |
| *H04L 12/933* | (2013.01) | |
| *H04L 12/709* | (2013.01) | |
| *H04L 12/931* | (2013.01) | |
| *H04L 12/26* | (2006.01) | |

(52) U.S. Cl.
CPC .......... *H04L 49/253* (2013.01); *H04L 45/245* (2013.01); *H04L 49/15* (2013.01); *H04L 43/0811* (2013.01); *H04L 49/201* (2013.01)

(58) Field of Classification Search
CPC ... H04L 43/0811; H04L 45/245; H04L 49/15; H04L 49/201; H04L 49/253
See application file for complete search history.

(56) References Cited

U.S. PATENT DOCUMENTS

| | | | |
|---|---|---|---|
| 5,442,701 A | 8/1995 | Guillou et al. | |
| 5,708,654 A | 1/1998 | Arndt et al. | |
| 6,242,629 B1 | 6/2001 | Ueno et al. | |
| 6,282,208 B1 | 8/2001 | Bowcutt et al. | |
| 6,330,615 B1 | 12/2001 | Gioquindo et al. | |
| 6,424,629 B1 * | 7/2002 | Rubino | H04L 29/06 370/241.1 |

(Continued)

FOREIGN PATENT DOCUMENTS

CN    104378337 B    6/2017

OTHER PUBLICATIONS

International Search Report and Written Opinion to corresponding International Application No. PCT/US18/40509 dated Sep. 14, 2018 (7 pages).

(Continued)

*Primary Examiner* — Stephen J Clawson
(74) *Attorney, Agent, or Firm* — James J. DeCarlo; Greenberg Traurig, LLP

(57) ABSTRACT

The disclosure provides a data transmission method and apparatus, and the method comprises: identifying that to-be-transmitted data comprises target data to be broadcast; and transmitting the target data to a plurality of network connection management devices coupled to network access devices, so that the plurality of network connection management devices may obtain data that needs to be broadcast directly from the network access devices without having to synchronize across the plurality of network connection management devices.

18 Claims, 16 Drawing Sheets

(56) References Cited

U.S. PATENT DOCUMENTS

| | | | |
|---|---|---|---|
| 6,473,858 B1 | 10/2002 | Shimomura et al. | |
| 7,577,407 B2 | 8/2009 | Karr et al. | |
| 7,653,363 B2 | 1/2010 | Karr et al. | |
| 7,797,552 B2 | 9/2010 | Kahn et al. | |
| 7,885,242 B2 | 2/2011 | Mahany et al. | |
| 8,458,453 B1 | 6/2013 | Mahalingaiah | |
| 8,813,113 B1 | 8/2014 | Duffield et al. | |
| 9,055,339 B2 | 6/2015 | Choi | |
| 10,237,179 B2* | 3/2019 | Natarajan | H04L 47/125 |
| 2002/0009081 A1* | 1/2002 | Sampath | H04L 12/462 |
| | | | 370/389 |
| 2004/0068589 A1* | 4/2004 | Witkowski | H04L 12/467 |
| | | | 709/249 |
| 2011/0058551 A1* | 3/2011 | Fernandez Gutierrez | |
| | | | H04L 12/185 |
| | | | 370/390 |
| 2011/0213976 A1 | 9/2011 | Ryou et al. | |
| 2012/0033668 A1* | 2/2012 | Humphries | H04L 12/185 |
| | | | 370/390 |
| 2012/0033672 A1* | 2/2012 | Page | H04L 45/245 |
| | | | 370/395.53 |
| 2012/0182866 A1* | 7/2012 | Vinayagam | H04L 45/245 |
| | | | 370/228 |
| 2012/0300773 A1* | 11/2012 | Maeda | H04L 61/103 |
| | | | 370/390 |
| 2014/0029618 A1* | 1/2014 | Janardhanan | H04L 45/586 |
| | | | 370/392 |
| 2014/0286335 A1 | 9/2014 | Wiget et al. | |
| 2015/0188808 A1* | 7/2015 | Ghanwani | H04L 45/48 |
| | | | 709/244 |
| 2016/0088336 A1 | 3/2016 | Wajs | |
| 2017/0019369 A1* | 1/2017 | Ravinoothala | H04L 61/103 |
| 2017/0019370 A1* | 1/2017 | Ravinoothala | H04L 61/103 |

OTHER PUBLICATIONS

International Preliminary Report on Patentability to corresponding International Application No. PCT/US2018/040509 dated Feb. 13, 2020 (6 pages).

* cited by examiner

METHOD AND APPARATUS FOR CONDITIONAL BROADCASTING OF NETWORK CONFIGURATION DATA

CROSS-REFERENCE TO RELATED APPLICATIONS

This application claims the benefit of priority of Chinese Application No. 201710648822.4, titled "METHOD AND APPARATUS FOR DATA TRANSMISSION, RETRANSMISSION, AND PROCESSING," filed on Aug. 1, 2017, which is hereby incorporated by reference in its entirety.

BACKGROUND

Technical Field

The disclosure relates to the technical field of data transmission, and in particular, to data transmission, retransmission, and processing methods and apparatuses thereof.

Description of the Related Art

Common network architectures of a large-scale data center include a core layer, an aggregation layer, and an access layer. A server is usually connected to a plurality of switches of the access layer. Some packets sent by the server to the switch need to be broadcast to all connected switches (for example, protocol packets like ARP (Address Resolution Protocol)).

In current systems, the packets that need to be broadcast are first sent by the server to some switches and then synchronized among the switches so that the packets are synchronized to all the connected switches. Therefore, to achieve synchronization of protocol packets such as ARP, there must be interconnection links between the switches. The interconnection links are used to implement technologies such as stacking, vPC (virtual port-channel), and MLAG (Multi-Chassis Link Aggregation Group), so that protocol packets such as ARP may be synchronized. For example, as shown in a block diagram of the ARP packet synchronization of the stacking technology in FIG. 1, a server sends an ARP packet, and the ARP packet is forwarded to the LEAF-2 switch via T2. After receiving the ARP packet, the LEAF-2 switch immediately synchronizes the ARP packet to the LEAF-1 switch through the interconnection link by using a stacking protocol. Therefore, to achieve synchronization of protocol packets such as ARP, there must be interconnection links between LEAF-1 and LEAF-2 as shown in FIG. 1. Stacking technology is implemented by using the interconnection links to implement the synchronization of protocol packets such as ARP.

However, the use of stacking, vPC, MLAG, and other technologies to implement the synchronization of protocol packets such as ARP leads to two problems that affect the entire system.

First, because technologies such as stacking, vPC, and MLAG require synchronous forwarding between two or more switches, and stacking technology even aims to achieve all-in-one management planes of two switches, problems on an individual switch often lead to the collapse of the plurality of switches in the entire system, which results in the interruption of all the next-level services provided by the switch and poses risks for the stable operation of the system.

Second, the use of technologies such as stacking, vPC, and MLAG leads to software interactive coupling between physical devices, making it difficult to upgrade the devices. When the devices are being upgraded, software versions will be inconsistent on different devices. If services are not interrupted, data synchronization will cause devices to crash. Therefore, services cannot be upgraded without interruption. Thus system upgrades in large-scale network architectures cannot be implemented using current techniques.

SUMMARY

In view of the above problems, the disclosure provides data transmission methods and apparatuses that overcome the above problems or at least partially solve the above problems.

In one embodiment, a method is disclosed comprising identifying, by a network access device, that to-be-transmitted data comprises target data to be broadcast; and transmitting, by the network access device, the target data to a plurality of network connection management devices connected to the network access device.

In another embodiment, a network access device is disclosed comprising: a processor; and a storage medium for tangibly storing thereon program logic for execution by the processor, the stored program logic comprising: logic, executed by the processor, for identifying that to-be-transmitted data comprises target data to be broadcast; and logic, executed by the processor, for transmitting the target data to a plurality of network connection management devices connected to the network access device.

In some embodiments, by identifying that to-be-transmitted data comprises target data that needs to be broadcast and respectively transmitting the target data to a plurality of network connection management devices connected to network access devices, the plurality of network connection management devices may obtain data that needs to be broadcast directly from the network access devices without having to synchronize across the plurality of network connection management devices. The method may therefore avoid the problem that individual network connection management device might have due to the dependence of broadcast data on data synchronization technologies such as stacking, vPC, MLAG, etc., and thus prevents the collapse of the plurality of network connection management devices in the entire system, which in turn improves the stability of the system. Moreover, the method also makes it possible to upgrade a system without having to interrupt the service when the software programs among the network connection management devices are interactively coupled.

Further, communication links are established respectively with all the network connection management devices and the target data is transmitted to the corresponding network connection management device through each communication link. In this way, the target data can be directly transmitted to the corresponding network connection management device through each communication link without having to go through other network connection management devices, thereby avoiding using the interconnection links among the network connection management devices and improving the stability of the system. Moreover, the method also makes it possible to upgrade a system without having to interrupt the service when the software programs among the network connection management devices are interactively coupled.

Further, by monitoring a connection state between the network access device and each network connection management device, when it is determined that the connection between the network access device and a certain network connection management device is restored and functioning, corresponding network access devices are instructed to perform a retransmission operation on the transmitted target data, thereby avoiding the problem that the network connection management device reconnected with the network access device cannot receive the target data again. Then, the problem that the reconnected network connection management device cannot be reused by the network access device is solved regarding the target data associated with the network configuration information, which in turn avoids the interruption of forwarding caused by disconnection of other network connection management devices after the network connection management device is reconnected.

The above description is merely an overview of the technical solutions of this disclosure. In order for people skilled in the art to better understand the technical means of the disclosure so that the technical solutions may be implemented more clearly and easily, the above description, other objectives, features, and advantages of the disclosure are illustrated in the following content of the specification. The embodiments of the disclosure are specifically described in what follows.

BRIEF DESCRIPTION OF THE DRAWINGS

Other advantages and benefits will become evident to a person skilled in the art by reading the following detailed description of the embodiments. The accompanying drawings are for illustrating the embodiments only and are not to be considered to limit the disclosure. Moreover, in the accompany drawings, same reference symbols are used to represent the same parts.

DETAILED DESCRIPTION

Exemplary embodiments of the disclosure will be described below in more detail with reference to the accompanying drawings. Although the accompanying drawings show exemplary embodiments, it should be understood that the disclosed embodiments may be implemented in various forms and should not be limited by the specific embodiments described herein. Instead, the disclosed embodiments are provided so that the disclosure will be better understood, and the scope of the disclosure can be fully conveyed to a person skilled in the art.

To make a person skilled in the art to better understand the disclosure, the following describes the concepts involved in the disclosure.

A network access device is used to connect various devices to the network architecture. For example, a network access device may include a network interface card or other hardware parts on a server, a program implemented by a server core, an external device of the server, a server, or any other applicable hardware or software, which is not limited in embodiments of the disclosure.

The network connection management device is used to provide connection management for network access devices accessing the network, which may include, switches, routers, or any other applicable device. The network connection management device is not limited in the embodiments of the disclosure.

In the disclosed embodiments, the network architecture includes network connection management devices and network access devices. The network access devices can access the network by means of a plurality of network connection management devices.

The embodiments of the disclosure can be applied to data transmission processes such as broadcasting ARP protocol packets. The multi-active access of the server generally adopts a bond bundle technology. The bond module or the network interface card uses a hash load balancing mode as a forwarding mechanism of all packets. The disclosure improves this forwarding mechanism so that protocol packets such as ARP can be sent directly to all accessed network connection management devices without having to use technologies such as stacking, vPC, MLAG among network connection management devices for synchronizing received protocol packets such as ARP.

Figure 1:
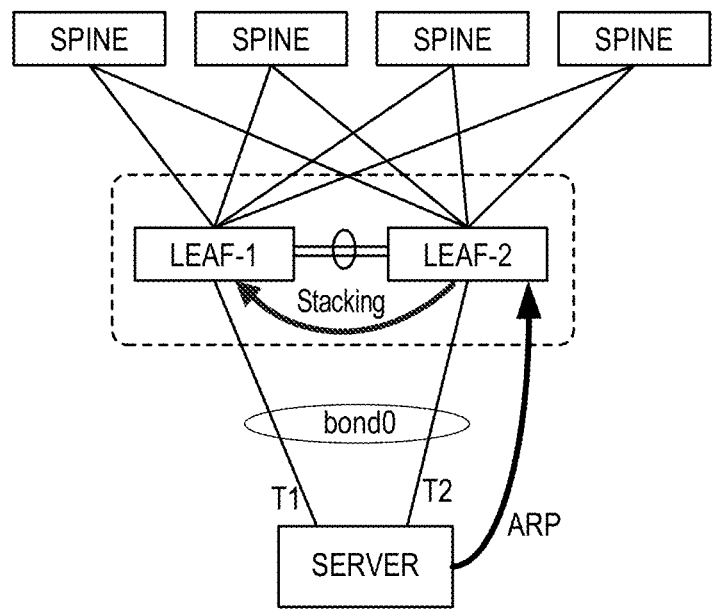
FIG. 1 is a block diagram of synchronization of ARP packets in the stacking technology.
Figure 2:
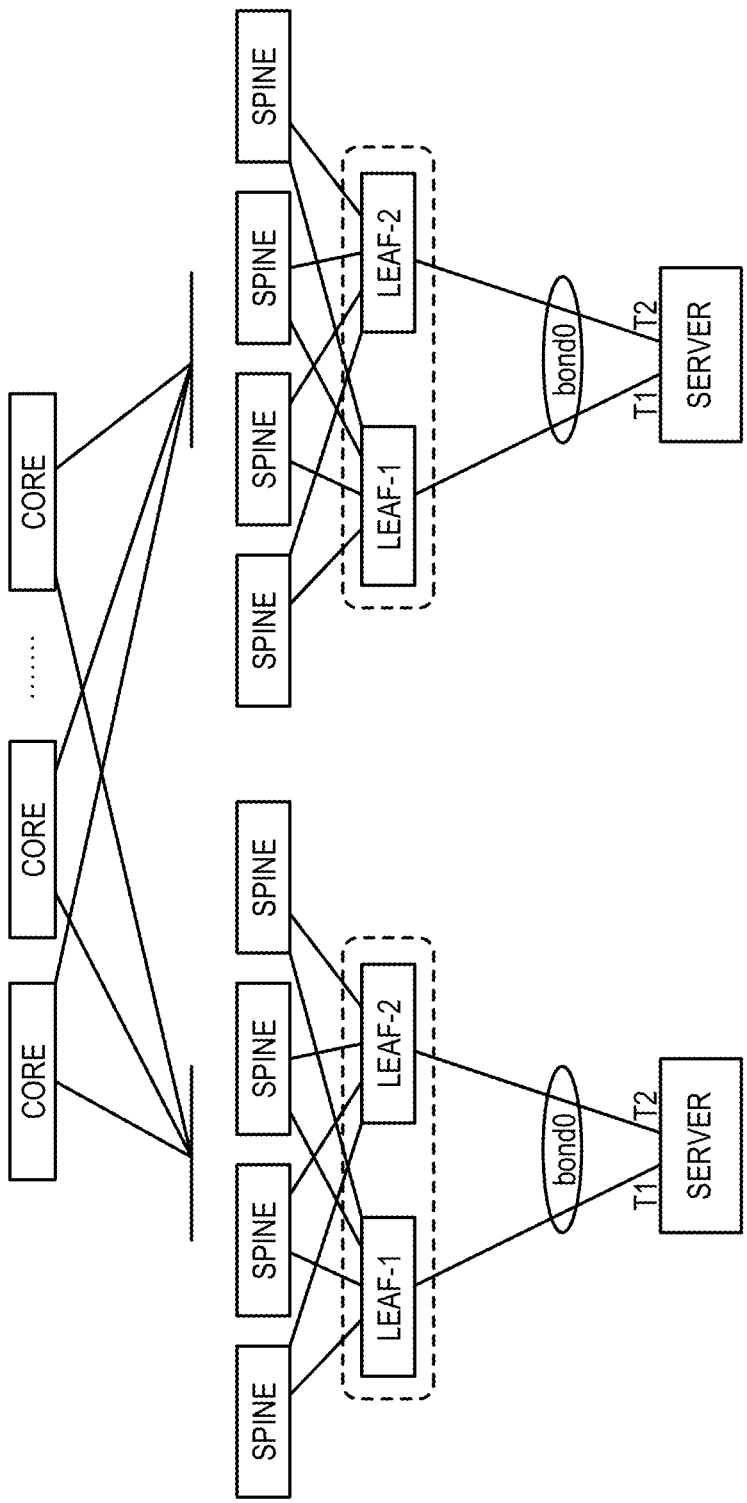
FIG. 2 is a block diagram of the networking of multi-active access of servers in the Leaf-Spine architecture.

In the block diagram of the networking of multi-active access of servers in the Leaf-Spine architecture shown in FIG. 2, the network consists of a CORE (core layer network device) layer, a SPINE (backbone layer network device) layer, and a LEAF (access layer network device) layer. The SPINE corresponds to an aggregation layer switch in a traditional architecture and LEAF corresponds to an access layer switch in the traditional architecture. Taking active-active access of a server as an example, the server uses a mode4 (dynamic link aggregation) mode of the bond module or network interface card, i.e., the LACP (Link Aggregation Control Protocol), to bundle two network ports T1 and T2 into one bond port bond0. The bond0 forwarding mode is Active-Active (active-active host mode). That is, both links can participate in forwarding.

In addition, it should be noted that some steps in the embodiments of the disclosure may be implemented by hardware or software. For example, execution of some steps is implemented by a network interface card, an external device, etc., and other steps are implemented by the server's kernel.

Figure 3:
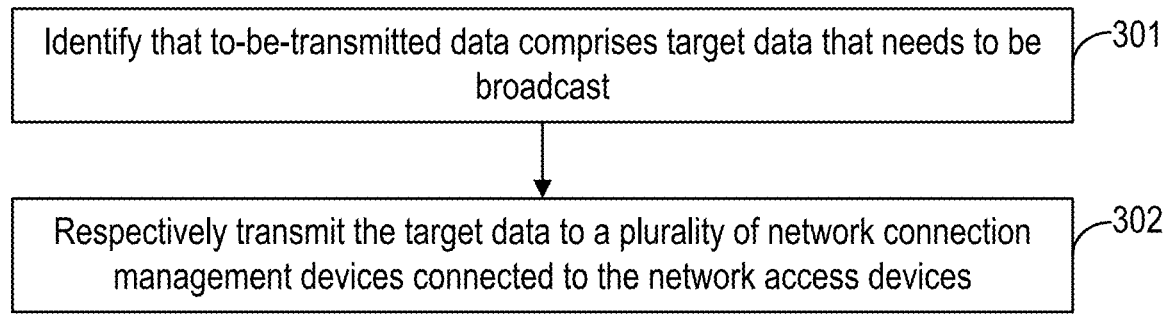
FIG. 3 is a flow diagram of a data transmission method according to some embodiments of the disclosure.

FIG. 3 is a flow diagram of a data transmission method according to some embodiments of the disclosure. The method is applied to network access devices accessing a network respectively by means of a plurality of network connection management devices. The network access devices performing network communication by means of some network connection management devices. The method may specifically include the following steps.

Step 301: identify that to-be-transmitted data comprises target data that needs to be broadcast.

In the illustrated embodiment, the network access device may first identify the target that needs to be broadcast to for the to-be-transmitted data. The target data (i.e., data that needs to be transmitted to all network connection management devices by the network access device) may specifically include data associated with network configuration information and may also include other data that needs to be synchronized among network connection management devices. This data that needs to be synchronized may comprise ARP packets or operating state notifications of the server, which are different according to specific network environments applied and different service requirements, which are not limited in this embodiment of the disclosure. The network configuration information is used as a basis by the network connection management device for accessing the network for the network access device. Therefore, the target data that needs to be broadcast to all network connection management devices may include target data associated with the network configuration information, such as a mapping relationship between a network address of the network device and a physical address of the network device.

In the illustrated embodiment, many methods exist for the target that needs to be broadcast to identify that the to-be-transmitted data includes the target data. The methods may correspond to data types, for example, identifying that the to-be-transmitted data includes target data associated with the network configuration information can be implemented by identifying type of information corresponding to the network configuration information included in the to-be-transmitted data. Specifically, any applicable method may be included, which is not limited in this embodiment of the disclosure.

For example, during data transmission on a server with an active-active connection Leaf-Spine network architecture, an application or data container on the server sends a packet to the bond0 bond port. After receiving the packet, the bond0 identifies the packet and identifies whether the packet type of the packet to be sent is an ARP packet, i.e., whether the EtherType (Ethernet type) of the packet is equal to 0x01006.

Step 102: respectively transmit the target data to the plurality of network connection management devices connected to the network access devices.

In the illustrated embodiment, the identified target data is respectively transmitted to the plurality of network connection management devices connected to the network access devices. That is, the target data may be respectively transmitted to all network connection management devices connected to the network access devices. The identified target data may also be sent to some network connection management devices connected to the network access devices. As long as the interconnection links among the network connection management devices can be reduced or avoided, and the dependence on technologies such as stacking, vPC, MLAG, etc. is reduced or avoided, the plurality of network connection management devices can be determined according to actual requirements, which are not limited in this embodiment of the disclosure.

For example, during data transmission on a server with an active-active connection Leaf-Spine network architecture, if an ARP packet is identified, the ARP packet is copied and transmitted to all the member ports of the bond0. After receiving packets of the bond0 bundle port, the network interface card may transmit the packets through the corresponding network ports on the network interface card. Because each network port is connected to a corresponding switch, each switch will receive an ARP packet.

Figure 4A:
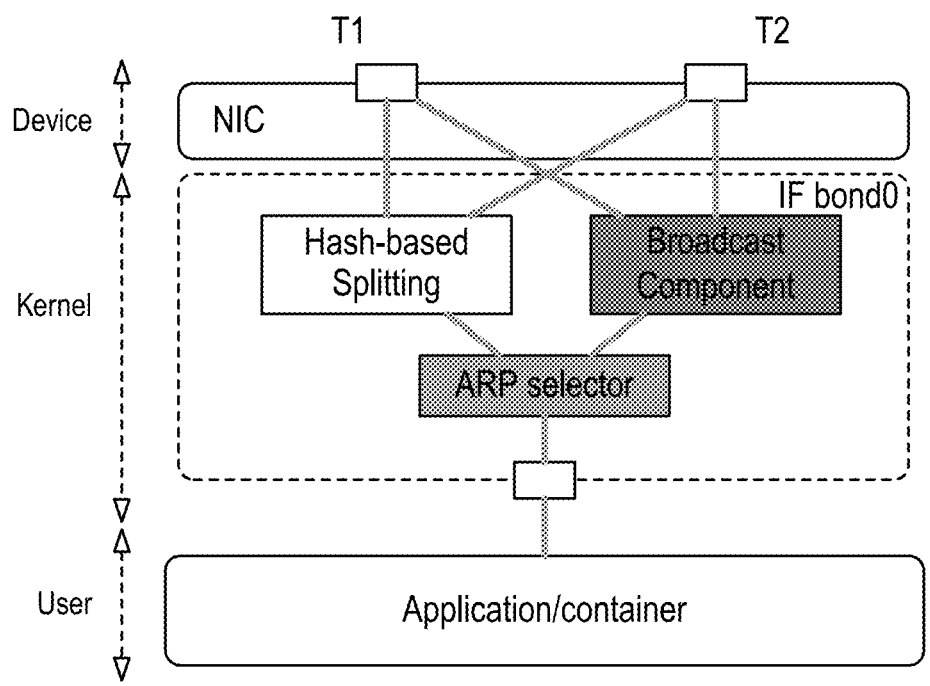
FIG. 4A is a block diagram of a server-side bond module implementing a data transmission process according to some embodiments of the disclosure.

FIG. 4A is a block diagram of a server-side bond module implementing a data transmission process according to some embodiments of the disclosure.

An ARP selector module (ARP identifying module), a broadcast component (broadcast module), and a Hash-based splitting module are implemented on the Kernel (a server kernel). The ARP selector module performs the step 301 of identifying whether the packet is an ARP packet. If so, the ARP selector module transmits the ARP packet to the broadcast component module, and performs the step 102 of transmitting the ARP packet to the network port on all the NICs (network interface cards), so as to transmit the packet to all the switches.

Figure 4B:
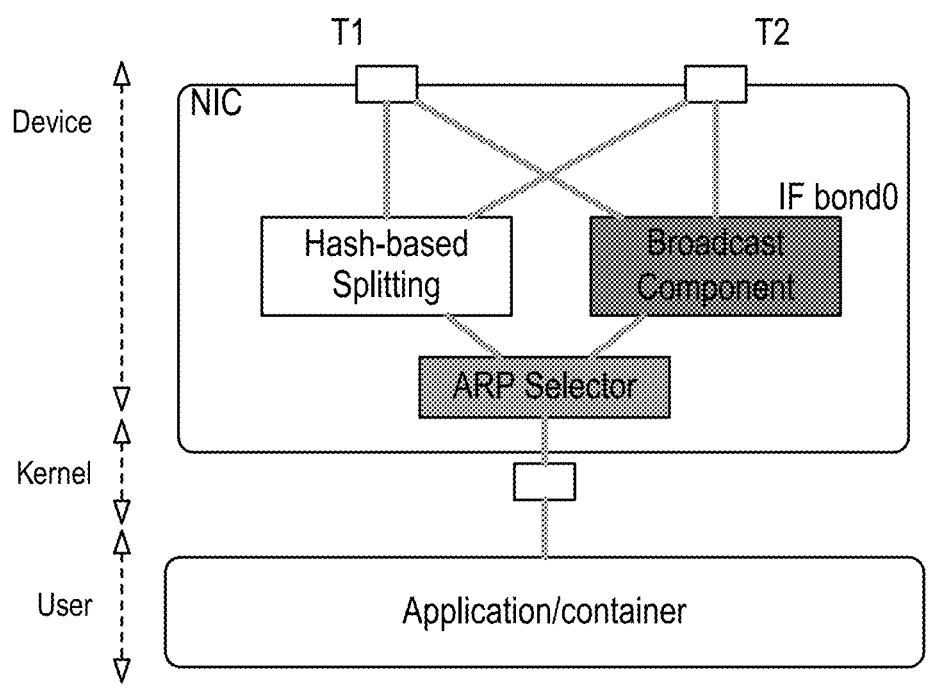
FIG. 4B is a block diagram of a network interface card on a server implementing a data transmission process according to some embodiments of the disclosure.

FIG. 4B is a block diagram of a network interface card on a server implementing a data transmission process according to some embodiments of the disclosure The ARP selector module, the broadcast component, and the hash-based splitting module are implemented on the NIC (the network interface card). The ARP selector module performs step 301 of identifying whether the packet is an ARP packet. If so, the ARP selector module transmits the ARP packet to the broadcast component module and performs the step 102 of transmitting the ARP packet to the network port on all the NICs (network interface cards), so as to transmit the packet to all the switches.

In some embodiments, by identifying that to-be-transmitted data comprises target data that needs to be broadcast, and respectively transmitting the target data to a plurality of network connection management devices connected to network access devices, the plurality of network connection management devices may obtain data that needs to be broadcast directly from the network access devices without having to synchronize across the plurality of network connection management devices. The method may therefore avoid the problems that individual network connection management device might have due to the dependence of broadcast data on data synchronization technologies such as stacking, vPC, MLAG, etc., and thus prevents the collapse of the plurality of network connection management devices in the entire system, which in turn improves the stability of the system. Moreover, the method also makes it possible to upgrade a system without having to interrupt the service when the software programs among the network connection management devices are interactively coupled.

In one embodiment, an implementation of identifying that to-be-transmitted data includes target data that needs to be broadcast includes identifying that the to-be-transmitted data includes target data associated with network configuration information. The network configuration information is used as a basis by the network connection management device for accessing the network for the network access device. Therefore, the target data associated with the network configuration information needs to be broadcast to the network connection management devices. For example, various ARP packets are data associated with the network configuration information.

In one embodiment, the target data associated with network configuration information comprises at least one of broadcast data comprising the network configuration information, feedback data comprising the network configuration information, and an acquisition request for the network configuration information. The network configuration information may be used to connect the server to the network by using a switch, and may include an address mapping relationship, and may also include a type of data based on current or subsequent establishment of a network relationship. Specifically, the broadcast data of the network configuration information includes data that needs to be broadcast which includes the network configuration information; and the broadcast data of the network configuration information may specifically be data including the address mapping relationship, such as gratuitous ARP (free ARP) packets. Feedback data of the network configuration information includes any data fed back in response to a request of the network configuration information, like ARP reply (ARP response) packets. The acquisition request for the network configuration information includes acquiring request data of the network configuration information, such as ARP request (ARP request) packets.

In one embodiment, the network configuration information includes a mapping relationship between a network address of the network device and a physical address of the network device, like a corresponding mapping relationship between an IP address (the network address) and the physical address in the ARP packet. An implementation of identifying that the to-be-transmitted data includes target data associated with network configuration information includes: identifying that the to-be-transmitted data is generated based on an address resolution protocol. The address resolution protocol is a network protocol of obtaining a physical address according to a network address, like an ARP protocol. If it is identified that the to-be-transmitted data is generated based on the address resolution protocol, the to-be-transmitted data includes target data associated with the network configuration information. Specifically, it can be determined, according to the protocol type included in the data, whether the to-be-transmitted data is generated based on the address resolution protocol, which is not limited in this embodiment of the disclosure.

In one embodiment, an implementation of identifying that the to-be-transmitted data includes target data associated with network configuration information includes: identifying that the to-be-transmitted data meets a data format of the target data associated with the network configuration information. Various target data associated with the network configuration information has corresponding data formats. If it is identified that the to-be-transmitted data meets a preset data format, it is identified that the to-be-transmitted data includes the target data associated with the network configuration information. For example, an ARP packet consists of a 14-bit Ethernet header and a 28-bit ARP request/response. According to the format order, the Ethernet header includes a target MAC (physical) address 0xFFFFFFFFFFFF (which is a broadcast address and targets thereof are all hosts on the network), a source MAC address (which is a MAC address of a request end), and a protocol type 0x01006 (which indicates the type of Ethernet frame and represents that this is an ARP protocol frame). The ARP request/response packet includes a hardware type, a protocol type, a hardware address, a protocol length, an operation type, a sender MAC address, a sender network address, a target MAC address, a target network address, and the like. The ARP request packet differs from the ARP response packet in that the source MAC address in the response packet is the target MAC address in the request packet, and the target MAC address is the source MAC address in the request packet.

In one embodiment, an implementation of respectively transmitting the target data to the plurality of network connection management devices connected to the network access devices includes: communication links are established respectively with all the network connection management devices and the target data is transmitted to the corresponding network connection management device through each communication link. In this way, the target data can be directly transmitted to the corresponding network connection management device through each communication link without having to go through other network connection management devices, thereby avoiding using the interconnection links among the network connection management devices and improving the stability of the system. Moreover, the method also makes it possible to upgrade a system without having to interrupt the service when the software programs among the network connection management devices are interactively coupled.

Figure 5:
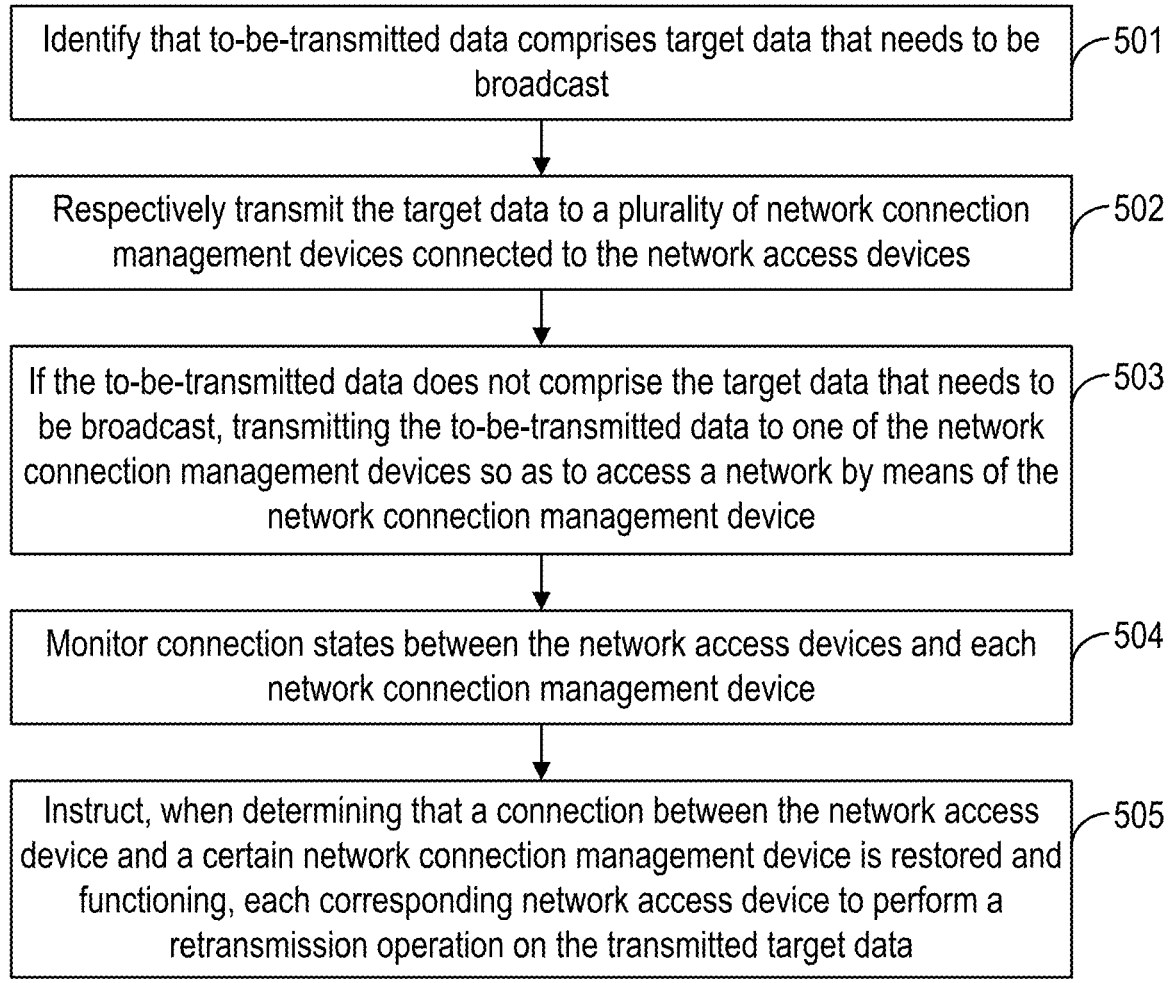
FIG. 5 is a flow diagram of a data transmission method according to some embodiments of the disclosure.

FIG. 5 is a flow diagram of a data transmission method according to some embodiments of the disclosure. The method is applied to network access devices accessing a network respectively by means of a plurality of network connection management devices, the network access devices performing network communication by means of some network connection management devices. The method may specifically include the following steps.

Step 501: identify that to-be-transmitted data comprises target data that needs to be broadcast.

Step 502: respectively transmit the target data to the plurality of network connection management devices connected to the network access devices.

Step 503: if the to-be-transmitted data does not comprise the target data that needs to be broadcast, transmitting the to-be-transmitted data to one of the network connection management devices (a target network connection management device) so as to access a network by means of the network connection management device.

In the illustrated embodiment, if an identification result indicates that the to-be-transmitted data does not include the target data that needs to be broadcast, the to-be-transmitted data is transmitted to one of the network connection management devices so that the network access device can access the network by means of the network connection management device.

For example, during data transmission on a server with an active-active access Leaf-Spine network architecture, if it is identified that it is not an ARP packet, the to-be-transmitted packet is transmitted by selecting a bond0 member port according to a hash rule. After receiving packets of the bond0 bundle port, the network interface card may transmit the packets through the corresponding network port on the network interface card. The network port is connected to a corresponding switch. Therefore, only one switch will receive the packet.

Step 504: monitor connection states between the network access devices and each network connection management device.

In the illustrated embodiment, the connection states include various states such as normal connection, disconnection, and reconnection. Monitoring the connection states between the network access devices and each network connection management device may include, for example, determining a connection state by means of timed requests and responses. Specifically, any applicable method may be used, which is not limited in this embodiment of the disclosure. The failure of any point in the link between the network access device and the network connection management device, such as the failure of the switch or the failure of the network port of the server, may cause the connection to be interrupted.

Step 505: instruct, when determining that a connection between the network access device and a certain network connection management device is restored and functioning, each corresponding network access device to perform a retransmission operation on the transmitted target data.

In the illustrated embodiment, according to the monitoring result of the connection state, if it is determined that the connection between the network access device and a certain network connection management device is restored and functioning, a corresponding network access device is instructed to perform a retransmission operation regarding the transmitted target data, which may be specifically retransmitting the transmitted target data to the reconnected network connection management device, or may be retransmitting the transmitted target data to all the network connection management devices connected to the network access device.

In one embodiment, an implementation of instructing each corresponding network access device to perform a retransmission operation regarding the transmitted target data includes: searching for at least one network connection management device correspondingly connected to the network access device; and transmitting a retransmission notification to the network access device so as to instruct the network access device to perform the retransmission operation for the transmitted target data on the searched at least one network connection management device.

The retransmission operation may be only for the reconnected network connection management device, or may be for all the network connection management devices. At least one reconnected network connection management device may be searched according to the monitored connection state; and all the network connection management devices may be searched based on historical connection records. The retransmission notification includes a mapping relationship between a network address and a physical address of at least one network connection management device, so as to instruct the network access device to perform the retransmission operation for the transmitted target data on the searched at least one network connection management device.

In one embodiment, before the monitoring connection states between the network access devices and each network connection management device, the method further includes: monitoring communication between the network access device and the network connection management device and recording at least one network connection management device communicating with the network access device. An implementation of searching for at least one network connection management device correspondingly connected to the network access device may include: searching for the recorded at least one network connection management device communicating with the network access device.

The record includes a mapping relationship between the network address and the physical address of the at least one network connection management device, and a connection state. When the network connection management device is searched, all the network connection management devices in the records may be searched. Alternatively, only network connection management devices that have just been reconnected may be searched according to changes of the connection state.

Figure 6:
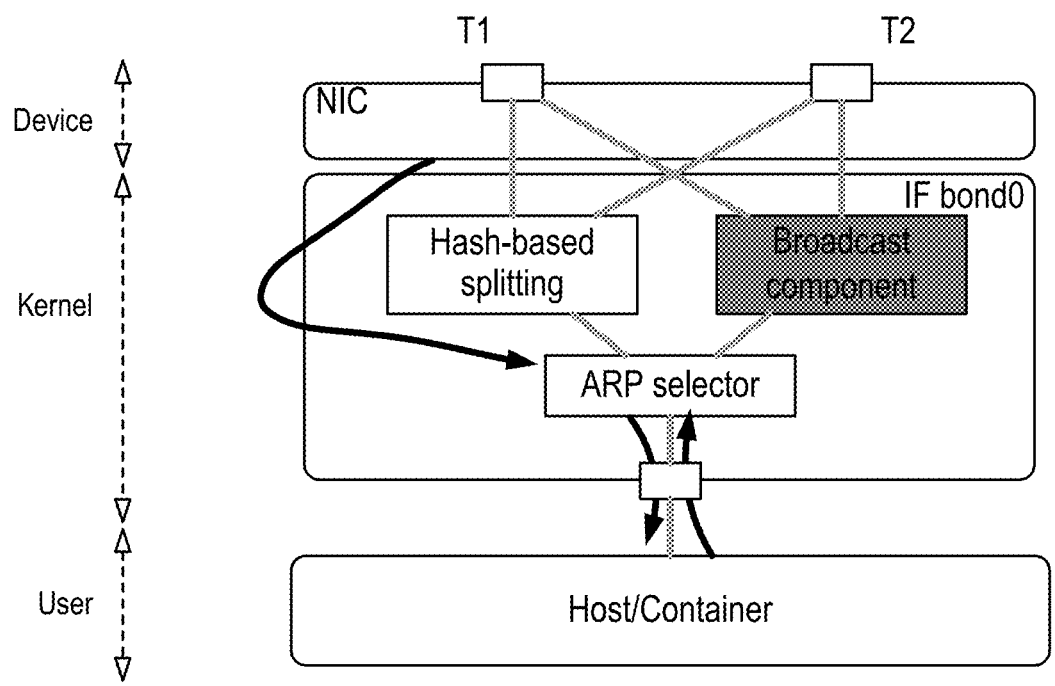
FIG. 6 is a block diagram illustrating the retransmission of ARP packets on a server that has an active-active Leaf-Spine network architecture.

For example, FIG. 6 is a block diagram of retransmission of ARP packets on a server that has an active-active Leaf-Spine network architecture.

An ARP data table is added to the ARP selector module. Whenever there is a new ARP packet passing through the ARP selector module, the mapping relationship between the network address and the physical address and the corresponding connection state of the switch communicating with the server are extracted from the packet, so as to update the ARP data table. When the bundle port bond0 detects that the connection is restored and functioning, the port bond0 notifies the ARP selector module; and the ARP selector module sends an ARP request (the ARP request packet) to a simulated gateway of the host or the data capacitor according to a switch list recorded in the ARP data table. The host or the data capacitor responds to the request and sends the ARP reply (the ARP reply packet). The ARP reply packet is broadcast to all the switches through the ARP selector module and the broadcast component module.

In some embodiments, by identifying that to-be-transmitted data comprises target data that needs to be broadcast, and respectively transmitting the target data to a plurality of network connection management devices connected to network access devices, the plurality of network connection management devices may obtain data that needs to be broadcast directly from the network access devices without having to synchronize across the plurality of network connection management devices. The method may therefore avoid the problems that individual network connection management device might have due to the dependence of broadcast data on data synchronization technologies such as stacking, vPC, MLAG, etc., and thus prevents the collapse of the plurality of network connection management devices in the entire system, which in turn improves the stability of the system. Moreover, the method also makes it possible to upgrade a system without having to interrupt the service when the software programs among the network connection management devices are interactively coupled.

Further, by monitoring a connection state between the network access device and each network connection management device, when it is determined that the connection between the network access device and a certain network connection management device is restored and functioning, corresponding network access devices are instructed to perform a retransmission operation on the transmitted target data, thereby avoiding the problem that the network connection management device reconnected with the network access device cannot receive the target data again. Then, the problem that the reconnected network connection management device cannot be reused by the network access device is solved regarding the target data associated with the network configuration information, which in turn avoids the interruption of forwarding caused by disconnection of other network connection management devices after the network connection management device is reconnected.

Figure 7:
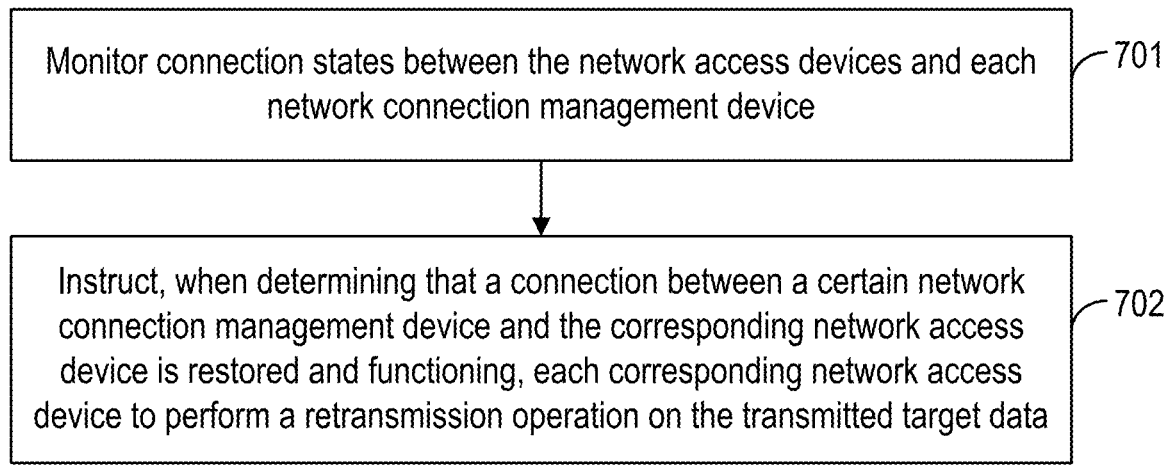
FIG. 7 is a flow diagram of a data retransmission method according to some embodiments of the disclosure.

FIG. 7 is a flow diagram of a data retransmission method according to some embodiments of the disclosure.

A data transmission method is applied to network access devices accessing a network respectively by means of a plurality of network connection management devices, the network access devices performing network communication by means of some network connection management devices. The method may specifically include the following steps.

Step 701: monitor connection states between the network access devices and each network connection management device.

Step 702: instruct, when determining that a connection between a certain network connection management device and the corresponding network access device is restored and functioning, each corresponding network access device to perform a retransmission operation on the transmitted target data.

In the illustrated embodiment, the retransmission operation includes respectively transmitting the target data to the plurality of network connection management devices connected to the network access devices.

In some embodiments, by monitoring a connection state between the network access device and each network connection management device, when it is determined that the connection between the network access device and a certain network connection management device is restored and functioning, corresponding network access devices are instructed to perform a retransmission operation on the transmitted target data, thereby avoiding the problem that the network connection management device reconnected with the network access device cannot receive the target data again. Then, the problem that the reconnected network connection management device cannot be reused by the network access device is solved regarding the target data associated with the network configuration information, which in turn avoids the interruption of forwarding caused by disconnection of other network connection management devices after the network connection management device is reconnected.

Figure 8:
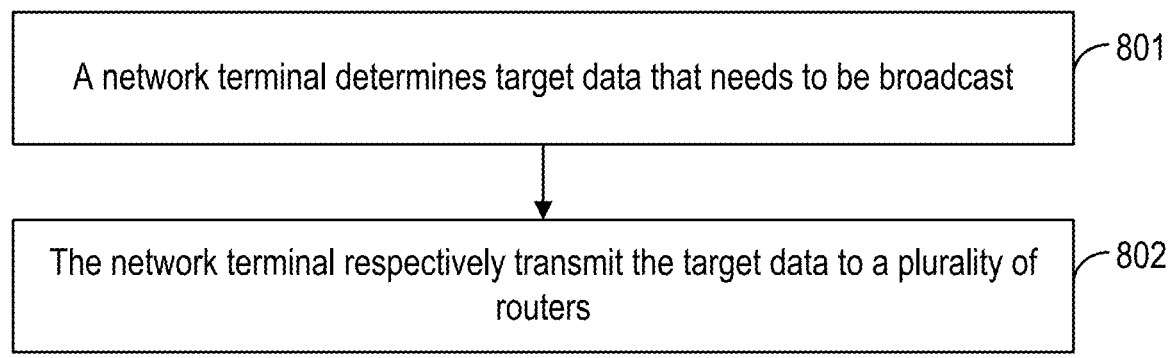
FIG. 8 is a flow diagram of a data processing method according to some embodiments of the disclosure.

FIG. 8 is a flow diagram of a data processing method according to some embodiments of the disclosure. The method may specifically include the following steps.

Step 801: A network terminal determines target data that needs to be broadcast.

In the illustrated embodiment, the network terminal includes a terminal device used in a network computing environment such as a server, a client, or any other applicable terminal, which is not limited in the illustrated embodiment. The network terminal accesses the network by means of the plurality of routers. For the to-be-transmitted data, the network terminal first determines the target data that needs to be broadcast.

Step 802: The network terminal respectively transmits the target data to the plurality of routers.

In the illustrated embodiment, the target data that needs to be broadcast is respectively transmitted to the plurality of routers. Alternatively, the target data may be transmitted to all the routers connected to the network terminal, or may be transmitted to some routers connected to the network terminal.

According to some embodiments, the network terminal is used to determine target data that needs to be broadcast. The network terminal respectively sends the target data to the plurality of routers and the plurality of routers can obtain data that needs to be broadcast directly from the network terminal without having to synchronize across the plurality of routers. The method may therefore avoid the problem that individual router might have due to the dependence of broadcast data on data synchronization technologies such as stacking, vPC, MLAG, etc., and thus prevents the collapse of the plurality of routers in the entire system, which in turn improves the stability of the system. Moreover, the method also makes it possible to upgrade a system without having to interrupt the service when the software programs among the routers are interactively coupled.

To make a person skilled in the art to better understand the disclosure, the following describes an implementation of the disclosure through specific examples.

Figure 9:
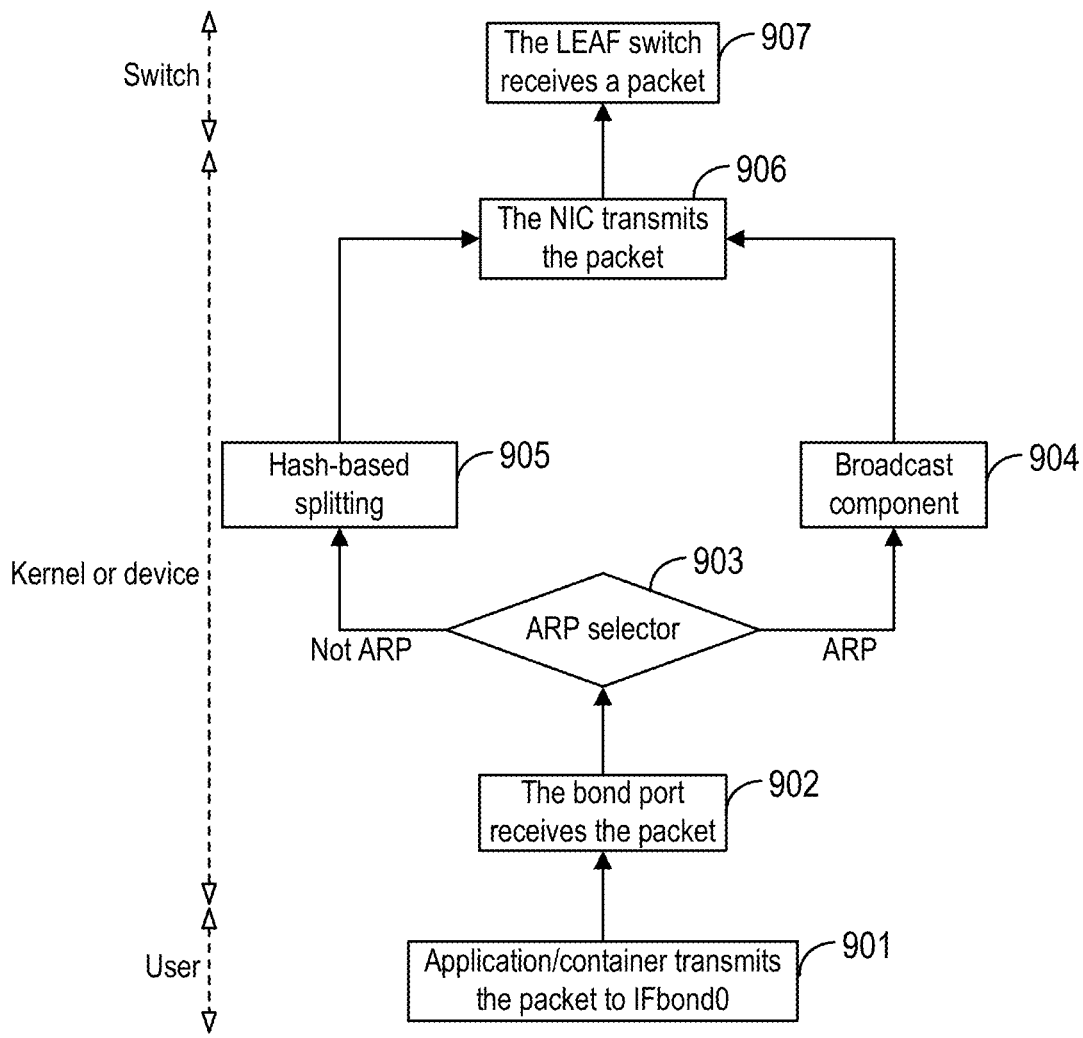
FIG. 9 is a flow diagram illustrating a data transmitting process of a server according to some embodiments of the disclosure.

FIG. 9 is a flow diagram illustrating a data transmitting process of a server according to some embodiments of the disclosure.

Step 901: An application or a container (data container) sends a packet to a bundle port bond0.

Step 902: The bundle port bond0 receives the packet.

Step 903: Packet selection is performed with the ARP selector (ARP selection) module. If the packet is an ARP packet, enter the broadcast component (broadcast module) for processing, and proceed to perform step 904; otherwise, if the packet is an packet that does not need to be broadcast, then enter a hash-based splitting module for processing, and proceed to step 905.

Step 904: The broadcast component broadcasts the packet, i.e., copying and transmitting the packet to all member ports corresponding to the bundle port bond0.

Step 905: The hash-based splitting module selects a member port of bundle bond0 according to the hash rule, and transmits the packet to the port.

Step 906: After receiving the packet of the bundle port bond0, the NIC (network interface card) transmits the packet; if the packet transmitted from the broadcast component in step 904 is performed, the packet is transmitted from a network interface corresponding to each port; if the packet transmitted from the hash-based splitting module in step 905 is performed, the packet may be transmitted by means of a certain network interface corresponding to the port.

Step 907: The switch receives the packet. At this time, all the switches receive the ARP packets, and synchronization among the switches is not required and non-ARP packets are correspondingly forwarded by a switch receiving the packet.

Figure 10:
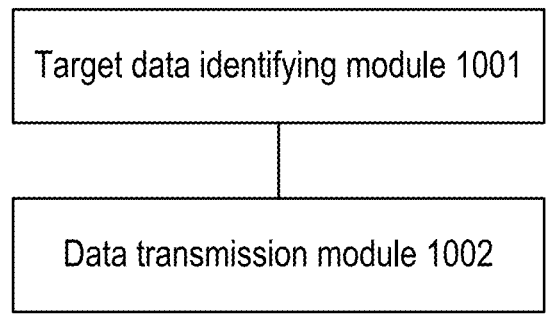
FIG. 10 is a block diagram of a data transmission apparatus according to some embodiments of the disclosure.

FIG. 10 is a block diagram of a data transmission apparatus according to some embodiments of the disclosure.

The apparatus is applied to network access devices accessing a network respectively by means of a plurality of network connection management devices, the network access devices performing network communication by means of some network connection management devices. The apparatus may specifically include: a target data identifying module 1001, configured to identify that to-be-transmitted data includes target data that needs to be broadcast; and a data transmission module 1002, configured to respectively transmit the target data to the plurality of network connection management devices connected to the network access devices.

In one embodiment of the disclosure, the apparatus further includes: an alternative transmission module, configured to perform the following: if the to-be-transmitted data does not comprise the target data that needs to be broadcast, transmit the to-be-transmitted data to one of the network connection management devices so as to access a network by means of the network connection management device.

In one embodiment of the disclosure, the target data identifying module includes: an associated data identifying submodule, configured to identify that the to-be-transmitted data comprises target data associated with network configuration information, the network configuration information is used as a basis by the network connection management device for accessing the network for the network access device.

In one embodiment of the disclosure, the target data associated with network configuration information comprises at least one of broadcast data comprising the network configuration information, feedback data comprising the network configuration information, and an acquisition request for the network configuration information.

In one embodiment of the disclosure, the network configuration information includes a mapping relationship between a network address of the network device and a physical address of the network device; and the associated data identifying submodule includes: a protocol generation identifying unit, configured to identify that the to-be-transmitted data is generated based on an address resolution protocol.

In one embodiment of the disclosure, the associated data identifying submodule includes: a data format identifying unit, configured to identify that the to-be-transmitted data meets a data format of the target data associated with the network configuration information.

In one embodiment of the disclosure, the data transmission module includes: a link transmission submodule, configured to respectively establish communication links with all the network connection management devices, and respectively transmit the target data to corresponding network connection management devices through the communication links.

In one embodiment of the disclosure, the apparatus further includes: a connection state monitoring module, configured to monitor connection states between the network access devices and each network connection management device; and a retransmission operation module, configured to instruct, when determining that a connection between the network access device and a certain network connection management device is restored and functioning, each corresponding network access device to perform a retransmission operation on the transmitted target data.

In one embodiment of the disclosure, the retransmission operation module includes: a device searching submodule, configured to search for at least one network connection management device correspondingly connected to the network access device; and a retransmission notification transmission submodule, configured to transmit a retransmission notification to the network access device so as to instruct the network access device to perform the retransmission operation for the transmitted target data on the searched at least one network connection management device.

In one embodiment of the disclosure, the apparatus further includes: a device recording module, configured to monitor, before monitoring the connection states between the network access devices and each network connection management device, communication between the network access devices and the network connection management devices and recording at least one network connection management device communicating with the network access devices; and the device searching submodule, specifically configured to search for the recorded at least one network connection management device communicating with the network access device.

In some embodiments, by identifying that to-be-transmitted data comprises target data that needs to be broadcast; and respectively transmitting the target data to a plurality of network connection management devices connected to network access devices, the plurality of network connection management devices may obtain data that needs to be broadcast directly from the network access devices without having to synchronize across the plurality of network connection management devices. The method may therefore avoid the problems that individual network connection management device might have due to the dependence of broadcast data on data synchronization technologies such as stacking, vPC, MLAG, etc., and thus prevents the collapse of the plurality of network connection management devices in the entire system, which in turn improves the stability of the system. Moreover, the method also makes it possible to upgrade a system without having to interrupt the service when the software programs among the network connection management devices are interactively coupled.

Figure 11:
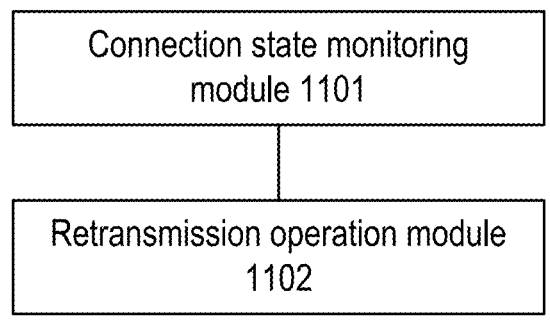
FIG. 11 is a block diagram of a data retransmission apparatus according to some embodiments of the disclosure.

FIG. 11 is a block diagram of a data retransmission apparatus according to some embodiments of the disclosure.

The apparatus is applied to network access devices accessing a network respectively by means of a plurality of network connection management devices, the network access devices performing network communication by means of some network connection management devices. The apparatus may specifically include: a connection state monitoring module 1101, configured to monitor connection states between network access devices and each network connection management device, the network access devices accessing the network respectively by means of a plurality of network connection management devices; and a retransmission operation module 1102, configured to instruct, when determining that a connection between a certain network connection management device and a corresponding network access device is restored and functioning, each corresponding network access device to perform a retransmission operation on target data already transmitted, wherein the target data comprises data that needs to be broadcast to each network connection management device connected to the network access devices.

In some embodiments, by monitoring a connection state between the network access device and each network connection management device, when it is determined that the connection between the network access device and a certain network connection management device is restored and functioning, corresponding network access devices are instructed to perform a retransmission operation on the transmitted target data, thereby avoiding the problem that the network connection management device reconnected with the network access device cannot receive the target data again. Then, the problem that the reconnected network connection management device cannot be reused by the network access device is solved regarding the target data associated with the network configuration information, which in turn avoids the interruption of forwarding caused by disconnection of other network connection management devices after the network connection management device is reconnected.

Figure 12:
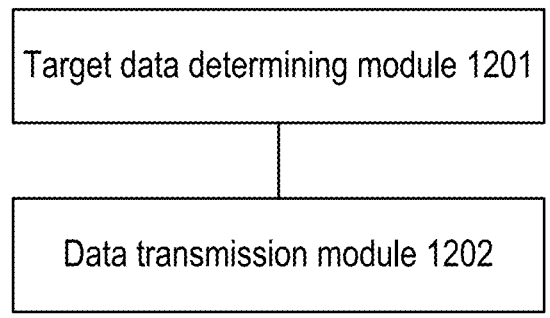
FIG. 12 is a block diagram of a data processing apparatus according to some embodiments of the disclosure.

FIG. 12 is a block diagram of a data processing apparatus according to some embodiments of the disclosure. The data processing apparatus may specifically include the following modules.

A target data determining module 1201 is configured to determine, by a network terminal, target data that needs to be broadcast, wherein the network terminal accesses a network by means of a plurality of routers.

A data transmission module 1202 is configured to respectively transmit, by the network terminal, the target data to the plurality of routers.

According to embodiments of the disclosure, the network terminal is used to determine target data that needs to be broadcast; the network terminal respectively sends the target data to the plurality of routers, the plurality of routers can obtain data that needs to be broadcast directly from the network terminal without having to synchronize across the plurality of routers. The method may therefore avoid the problem that individual router might have due to the dependence of broadcast data on data synchronization technologies such as stacking, vPC, MLAG, etc., and thus prevents the collapse of the plurality of routers in the entire system, which in turn improves the stability of the system. Moreover, the method also makes it possible to upgrade a system without having to interrupt the service when the software programs among the routers are interactively coupled.

Figure 13:
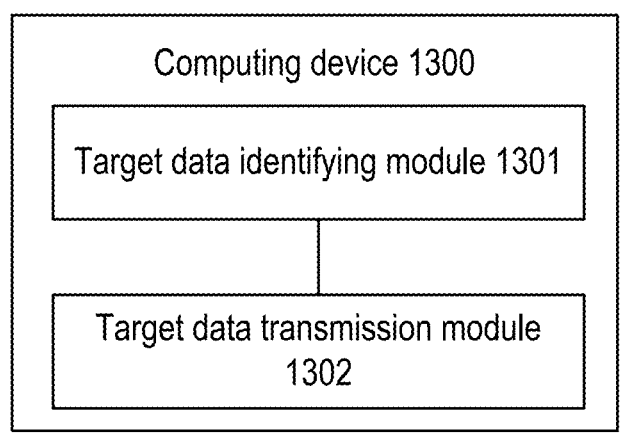
FIG. 13 is a block diagram of a computing device according to some embodiments of the disclosure.

FIG. 13 is a block diagram of a computing device according to some embodiments of the disclosure.

In this embodiment of the application, the computing device 1300 includes any device that can compute, for example, a server, hardware components other than the network card on a server, an external device of a server, or a program implemented by a server kernel, i.e., a virtual device, and the like; and the computing device may specifically include any suitable hardware or software implementation, which is not limited in this embodiment of the disclosure.

The computing device 1300 is connected to a network connection management device by means of different network interfaces, and the computing device 1300 includes: a target data identifying module 1301, configured to identify that to-be-transmitted data includes target data that needs to be broadcast; and a target data transmission module 1302, configured to respectively transmit the target data to network connection management devices corresponding to the network interfaces by means of the network interfaces.

In one embodiment of the disclosure, the computing device is provided with at least one network interface card; different ports of the computing device are respectively connected to different network interfaces of the network interface card; and the network interfaces are correspondingly connected to different network connection management devices. The computing device may be connected to different network interfaces on the network interface card through different ports. Different network interfaces correspond to different network connection management devices. Data may be sent to each network connection management device through different network interfaces.

In some embodiments, by identifying that to-be-transmitted data comprises target data that needs to be broadcast; and respectively transmitting the target data to a plurality of network connection management devices connected to network access devices, the plurality of network connection management devices may obtain data that needs to be broadcast directly from the network access devices without having to synchronize across the plurality of network connection management devices. The method may therefore avoid the problems that individual network connection management device might have due to the dependence of broadcast data on data synchronization technologies such as stacking, vPC, MLAG, etc., and thus prevents the collapse of the plurality of network connection management devices in the entire system, which in turn improves the stability of the system. Moreover, the method also makes it possible to upgrade a system without having to interrupt the service when the software programs among the network connection management devices are interactively coupled.

Figure 14:
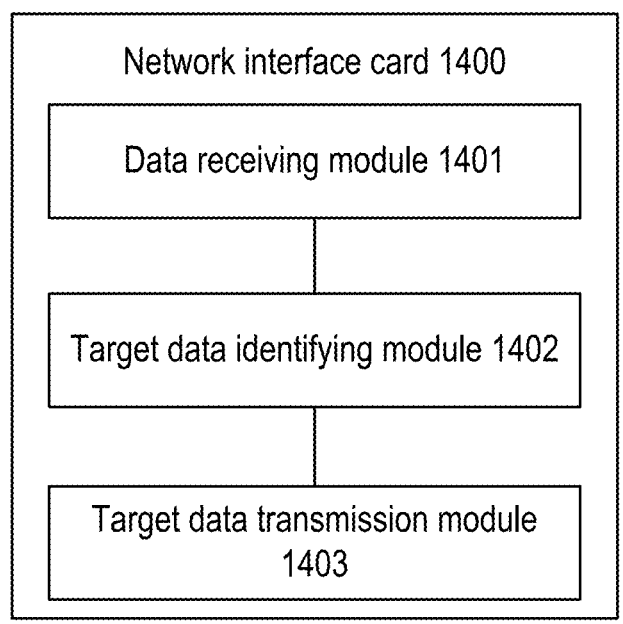
FIG. 14 is a block diagram of a network interface card according to some embodiment of the disclosure.

FIG. 14 is a block diagram of a network interface card according to some embodiment of the disclosure.

In this embodiment of the disclosure, the network interface card 1400 is provided with a plurality of network interfaces; the network interfaces are correspondingly connected to different network connection management devices; and the network interfaces are correspondingly connected to different ports on the computing device.

The network interface card 1400 includes: a data receiving module 1401, configured to receive to-be-transmitted data of the computing device; a target data identifying module 1402, configured to identify that the to-be-transmitted data of the computing device includes target data that needs to be broadcast; and a target data transmission module 1403, configured to respectively transmit the target data to network connection management devices corresponding to the network interfaces by means of the network interfaces.

In some embodiments, by identifying that to-be-transmitted data comprises target data that needs to be broadcast; and respectively transmitting the target data to a plurality of network connection management devices connected to network access devices, the plurality of network connection management devices may obtain data that needs to be broadcast directly from the network access devices without having to synchronize across the plurality of network connection management devices. The method may therefore avoid the problems that individual network connection management device might have due to the dependence of broadcast data on data synchronization technologies such as stacking, vPC, MLAG, etc., and thus prevents the collapse of the plurality of network connection management devices in the entire system, which in turn improves the stability of the system. Moreover, the method also makes it possible to upgrade a system without having to interrupt the service when the software programs among the network connection management devices are interactively coupled.

With regard to the apparatus embodiments, because the apparatus embodiments are substantially similar to the method embodiments, the description is relatively concise, and reference can be made to the description of the method embodiments for related parts.

Figure 15:
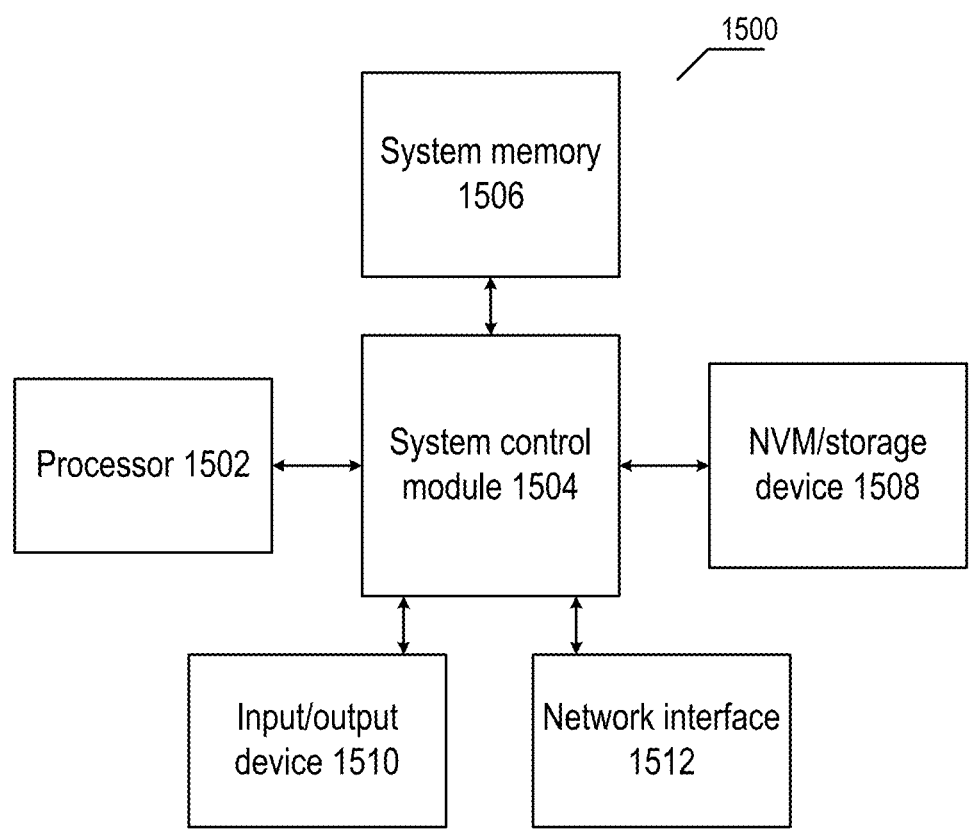
FIG. 15 illustrates an exemplary system that can be used to implement various embodiments.

The embodiments can be implemented as a system that uses any suitable hardware, firmware, or software, or any combination thereof to perform desired configuration. FIG. 15 illustrates an exemplary system or apparatus 1500 that can be used to implement various embodiments described previously.

For one embodiment, FIG. 15 illustrates the exemplary system 1500. The system has one or more processors 1502; at least one system control module (chip set) 1504 coupled to the processor(s) 1502; a system memory 1506 coupled to the system control module 1504; a non-volatile memory (NVM)/storage device 1508 coupled to the system control module 1504; one or more input/output devices 1510 coupled to the system control module 1504; and a network interface 1512 coupled to the system control module 1506.

The processors 1502 may include one or more single-core or multi-core processors. The processors 1502 may include any combination of general purpose processors or special purpose processors (for example, graphics processors, application processors, or baseband processors). In some embodiments, the system 1500 can be used as a browser as described in the embodiments of the disclosure.

In some embodiments, the system 1500 may include one or more computer-readable media (for example, the system memory 1506 or NVM/storage device 1508) having instructions and one or more processors 1502 coupled to the one or more computer-readable media and configured to execute the instructions to implement modules so as to perform actions described in the disclosure.

For one embodiment, the system control module 1504 may include any suitable interface controller to provide any suitable interface to at least one of the processor(s) 1502 and/or to any suitable device or component in communication with the system control module 1504.

The system control module 1504 may include a memory controller module to provide an interface to the system memory 1506. The memory controller module may be a hardware module, a software module, and/or a firmware module.

The system memory 1506 may be used to load and store data and/or instructions, for example, for the system 1500. For one embodiment, the system memory 1506 may include any suitable volatile memory, such as a suitable DRAM. In some embodiments, the system memory 1506 may include a double data rate type 4 synchronous dynamic random access memory (DDR4 SDRAM).

For one embodiment, the system control module 1504 may include one or more input/output controllers to provide an interface to the NVM/storage device 1508 and the (one or more) input/output device 1510.

For example, the NVM/storage device 1508 may be used to store data and/or instructions. The NVM/storage device 1508 may include any suitable non-volatile memory (for example, a flash memory) and/or may include any suitable (one or more) non-volatile storage device (for example, one or more hard disk drives (HDDs), one or more compact disc (CD) drives, and/or one or more digital versatile disc (DVD) drives).

The NVM/storage device 1508 may include a storage resource that physically forms a part of a device on which the system 1500 is installed; or it may be accessible by the device and not necessarily being a part of the device. For example, the NVM/storage device 1508 may be accessed over a network via the (one or more) input/output device 1510.

The (one or more) input/output device 1510 may provide an interface for the system 1500 to communicate with any other suitable device. The input/output devices 1510 may include a communication component, an audio component, a sensor component, and the like. The network interface 1512 may provide an interface for the system 1500 to communicate through one or more networks. The system 1500 may wirelessly communicate with one or more components of a wireless network in accordance with any of one or more wireless network standards and/or protocols. such as accessing a wireless network based on a communication standard like Wi-Fi (wireless fidelity), 2G, or 3G or a combination thereof to perform wireless communication.

For one embodiment, at least one of the (one or more) processor 1502 may be packaged together with logic of one or more controllers (for example, the memory controller module) of the system control module 1504. For one embodiment, at least one of the processor(s) 1502 may be packaged together with logic of one or more controllers of the system control module 1504 to form a System in Package (SiP). For one embodiment, at least one of the (one or more) processor 1502 may be integrated on the same die with logic of one or more controllers of the system control module 1504. For one embodiment, at least one of the (one or more) processor 1502 may be integrated on the same die with logic of one or more controllers of the system control module 1504 to form a System on Chip (SoC).

In various embodiments, the system 1500 may be, but is not limited to, a browser, a workstation, a desktop computing device, or a mobile computing device (for example, a laptop computing device, a hand-held computing device, a tablet computer, or a netbook). In various embodiments, the system 1500 may have more or fewer components and/or different architectures. For example, in some embodiments, the system 1500 includes one or more of a camera, a keyboard, a liquid crystal display (LCD) screen (including a touch screen display), a non-volatile memory port, multiple antennas, a graphics chip, an application specific integrated circuit (ASIC), and a speaker.

If the display includes a touch panel, a display screen may be implemented as a touch screen display to receive input signals from a user. The touch panel includes one or more touch sensors to sense touches, swipes, and gestures on the touch panel. The touch sensors may not only sense a boundary of a touch or swipe action, but also detect a period of time and a pressure related to the touch or swipe operation.

An embodiment of the disclosure further provides a non-volatile readable storage medium, where the storage medium stores one or more modules (programs), which, when applied to a terminal device, enable the terminal device to execute instructions of various method steps in the embodiments of the disclosure.

In one example, a computer device is provided, which includes a memory, a processor, and a computer program stored on the memory and capable of running on the processor, wherein the processor, when executing the computer program, implements the methods in some embodiments.

One example further provides a computer-readable storage medium, having a computer program stored thereon, wherein the program, when executed by a processor, implements the one or more methods in some embodiments of the disclosure.

The embodiments of the disclosure provide a data transmission method and apparatus. Example 1 includes a data transmission method, applied to network access devices accessing a network respectively by means of a plurality of network connection management devices, the network access devices performing network communication by means of some network connection management devices. The method comprises: identifying that to-be-transmitted data comprises target data that needs to be broadcast, and respectively transmit the target data to the plurality of network connection management devices connected to the network access devices.

Example 2 may include the method of Example 1, wherein the method further includes: if the to-be-transmitted data does not comprise the target data that needs to be broadcast, transmitting the to-be-transmitted data to one of the network connection management devices so as to access a network by means of the network connection management device.

Example 3 may include the method of Example 1 and/or Example 2, wherein the identifying that to-be-transmitted data comprises target data that needs to be broadcast includes: identifying that the to-be-transmitted data comprises target data associated with network configuration information, the network configuration information being used as a basis by the network connection management device for accessing the network for the network access device.

Example 4 may include the method of Example 1 and/or Example 3, wherein the target data associated with network configuration information comprises at least one of broadcast data comprising the network configuration information, feedback data comprising the network configuration information, and an acquisition request for the network configuration information.

Example 5 may include the method of Example 1 and/or Example 4, wherein the network configuration information comprises a mapping relationship between a network address of the network device and a physical address of the network device, and the identifying that the to-be-transmitted data comprises target data associated with network configuration information includes: identifying that the to-be-transmitted data is generated based on an address resolution protocol.

Example 6 may include the method of Example 1 and/or Example 5, wherein identifying that the to-be-transmitted data comprises target data associated with network configuration information includes: identifying that the to-be-transmitted data meets a data format of the target data associated with the network configuration information.

Example 7 may include the method of Example 1 and/or Example 6, wherein the respectively transmit the target data to the plurality of network connection management devices connected to the network access devices includes: respectively establishing communication links with all the network connection management devices, and respectively transmitting the target data to corresponding network connection management devices through the communication links.

Example 8 may include the method of Example 1 and/or Example 8, wherein the method further includes: monitoring connection states between the network access devices and each network connection management device; and instructing, when determining that a connection between the network access device and a certain network connection management device is restored and functioning, each corresponding network access device to perform a retransmission operation on the transmitted target data.

Example 9 may include the method of Example 1 and/or Example 8, wherein the instructing each corresponding network access device to perform a retransmission operation on the transmitted target data includes: searching for at least one network connection management device correspondingly connected to the network access device; and transmitting a retransmission notification to the network access device so as to instruct the network access device to perform the retransmission operation for the transmitted target data on the searched at least one network connection management device.

Example 10 may include the method of Example 1 and/or Example 9, wherein before the monitoring connection states between the network access devices and each network connection management device, the method further includes: monitoring communication between the network access devices and the network connection management devices and recording at least one network connection management device communicating with the network access devices; the searching for at least one network connection management device correspondingly connected to the network access device comprises: searching for the recorded at least one network connection management device communicating with the network access device.

Example 11 includes a data retransmission method, including: monitoring connection states between network access devices and each network connection management device, the network access devices accessing the network respectively by means of a plurality of network connection management devices; and instructing, when determining that a connection between a certain network connection management device and a corresponding network access device is restored and functioning, each corresponding network access device to perform a retransmission operation on target data already transmitted, wherein the target data comprises data that needs to be broadcast to each network connection management device connected to the network access devices, and the retransmission operation comprises respectively transmitting the target data to the plurality of network connection management devices connected to the network access devices.

Example 12 includes a data processing method, including: determining, by a network terminal, target data that needs to be broadcast, wherein the network terminal accesses a network by means of a plurality of routers; and respectively transmitting, by the network terminal, the target data to the plurality of routers.

Example 13 includes a data transmission apparatus, applied to network access devices accessing a network respectively by means of a plurality of network connection management devices, the network access devices performing network communication by means of some network connection management devices, wherein the apparatus includes: a target data identifying module, configured to identify that to-be-transmitted data includes target data that needs to be broadcast; and a data transmission module, configured to respectively transmit the target data to the plurality of network connection management devices connected to the network access devices.

Example 14 may include the apparatus described in Example 13, wherein the apparatus further includes: an alternative transmission module, configured to perform the following: if the to-be-transmitted data does not comprise the target data that needs to be broadcast, transmit the to-be-transmitted data to one of the network connection management devices so as to access a network by means of the network connection management device.

Example 15 may include one or more apparatuses described in Examples 13 and 14, wherein the target data identifying module includes: an associated data identifying submodule, configured to identify that the to-be-transmitted data comprises target data associated with network configuration information, the network configuration information is used as a basis by the network connection management device for accessing the network for the network access device.

Example 16 may include one or more apparatuses in Examples 13 and 15, wherein the target data associated with network configuration information comprises at least one of broadcast data comprising the network configuration information, feedback data comprising the network configuration information, and an acquisition request for the network configuration information.

Example 17 may include one or more apparatuses described in Examples 13 and 16, wherein the network configuration information includes a mapping relationship between a network address of the network device and a physical address of the network device; and the associated data identifying submodule includes: a protocol generation identifying unit, configured to identify that the to-be-transmitted data is generated based on an address resolution protocol.

Example 18 may include one or more apparatuses described in Examples 13 and 17, wherein the associated data identifying submodule includes: a data format identifying unit, configured to identify that the to-be-transmitted data meets a data format of the target data associated with the network configuration information.

Example 19 may include one or more apparatuses described in Examples 13 and 18, wherein the data transmission module includes: a link transmission submodule, configured to respectively establish communication links with all the network connection management devices, and respectively transmit the target data to corresponding network connection management devices through the communication links.

Example 20 may include one or more apparatuses described in Examples 13 and 19, wherein the data transmission module includes: a forwarding submodule, configured to transmit the target data to at least two network connection management devices; and forward, by the at least two network connection management devices, the target data to other network connection management devices.

Example 21 may include one or more apparatuses described in Examples 13 and 20, wherein the apparatus further includes: a connection state monitoring module, configured to monitor connection states between the network access devices and each network connection management device; and a retransmission operation module, configured to instruct, when determining that a connection between the network access device and a certain network connection management device is restored and functioning, each corresponding network access device to perform a retransmission operation on the transmitted target data.

Example 22 may include one or more apparatuses described in Examples 13 and 21, wherein the retransmission operation module includes: a device searching submodule, configured to search for at least one network connection management device correspondingly connected to the network access device; and a retransmission notification transmission submodule, configured to transmit a retransmission notification to the network access device so as to instruct the network access device to perform the retransmission operation for the transmitted target data on the searched at least one network connection management device.

Example 23 may include one or more apparatuses described in Examples 12 and 22, wherein the apparatus further includes: a device recording module, configured to monitor, before monitoring the connection states between the network access devices and each network connection management device, communication between the network access devices and the network connection management devices and recording at least one network connection management device communicating with the network access devices; and the device searching submodule, specifically configured to search for the recorded at least one network connection management device communicating with the network access device.

Example 24 includes a data retransmission apparatus, including: a connection state monitoring module, configured to monitor connection states between network access devices and each network connection management device, the network access devices accessing the network respectively by means of a plurality of network connection management devices; and a retransmission operation module, configured to instruct, when determining that a connection between a certain network connection management device and a corresponding network access device is restored and functioning, each corresponding network access device to perform a retransmission operation on target data already transmitted, wherein the target data comprises data that needs to be broadcast to each network connection management device connected to the network access devices, and the retransmission operation comprises respectively transmitting the target data to the plurality of network connection management devices connected to the network access devices.

Example 25 includes a data processing apparatus, including: a target data determining module, configured to determine, by a network terminal, target data that needs to be broadcast, wherein the network terminal accesses a network by means of a plurality of routers; and a data transmission module, configured to respectively transmit, by the network terminal, the target data to the plurality of routers.

Example 26 includes a computing device, and the computing device is connected to a network connection management device by means of different network interfaces. The computing device includes: a target data identifying module, configured to identify that to-be-transmitted data includes target data that needs to be broadcast; and a target data transmission module, configured to respectively transmit the target data to network connection management devices corresponding to the network interfaces by means of the network interfaces.

Example 27 may include the device of Example 25, wherein the computing device is provided with at least one network interface card; different ports of the computing device are respectively connected to different network interfaces of the network interface card; and the network interfaces are correspondingly connected to different network connection management devices.

Example 28 includes a network interface card, wherein the network interface card is provided with a plurality of network interfaces, each network interface is correspondingly connected to a different network connection management device, and each network interface is correspondingly connected to a different port on the computing device; the network interface card includes: a data receiving module, configured to receive to-be-transmitted data of the computing device; a target data identifying module, configured to identify that the to-be-transmitted data of the computing device includes target data that needs to be broadcast; and a target data transmission module, configured to respectively transmit the target data to network connection management devices corresponding to the network interfaces by means of the network interfaces.

Example 29 includes a computer device, including a memory, a processor, and a computer program stored on the memory and can be run on the processor. The processor, when executing the computer program, implements the one or more methods of Examples 1 to 12.

Example 28 includes a computer-readable storage medium having a computer program stored thereon. The program, when being executed by a processor, implements the one or more methods of Examples 1 to 12.

Although some embodiments are provided for the purpose of explanation and description, various replacements and/or equivalent implementation solutions or computations that achieve the implementation shown and described in the embodiments with the same purpose do not depart from the implementation scope of the disclosure. The disclosure is intended to cover any modifications or changes to the embodiments discussed herein. Therefore, it is apparent that the embodiments described herein are only defined by the claims and their equivalents.

What is claimed is:
1. A method comprising:
receiving, by a network access device, to-be-transmitted data over a bonded network port, the bonded network port including a plurality of physical network ports;
determining, by the network access device, whether the to-be-transmitted data comprises target data to be broadcast;
transmitting, by the network access device if the to-be-transmitted data comprises target data to be broadcast, the target data to a plurality of network connection management devices coupled to the network access device by transmitting the target data on a plurality of the physical network ports of the network access device, each port of the physical network ports coupled to a corresponding switch; and if the to-be-transmitted data does not comprise target data to be broadcast:
  selecting a physical network port from the plurality of physical network ports based on a hash rule, and
  transmitting the to-be-transmitted data to a target network connection management device using the physical network port.

2. The method of claim 1, the identifying that to-be-transmitted data comprises target data to be broadcast comprising identifying whether a packet type of the to-be-transmitted data matches a pre-determined packet type.

3. The method of claim 1, the identifying that to-be-transmitted data comprises target data to be broadcast comprising identifying that the to-be-transmitted data includes network configuration information.

4. The method of claim 3, the network configuration information comprising a mapping relationship between a network address of a network device and a physical address of the network device.

5. The method of claim 3, the identifying that to-be-transmitted data comprises target data to be broadcast comprising identifying that the to-be-transmitted data matches a data format of target data associated with network configuration information.

6. The method of claim 1, the identifying and transmitting being performed by a kernel of the network access device or being performed by a network interface card of the network access device.

7. The method of claim 1, further comprising:
  monitoring, by the network access device, connection states between the network access device and the plurality of network connection management devices; and
  retransmitting, by the network access device, the target data in response to determining that a connection between the network access device and a network connection management device is restored.

8. The method of claim 1, the transmitting the target data to a plurality of network connection management devices coupled to the network access device comprising transmitting the target data on all of the plurality of physical network ports of the bond port.

9. The method of claim 1, the transmitting the target data further comprising:
  establishing direct communication links with each of the plurality of network connection management devices; and
  transmitting the target data to each of the plurality of network connection management devices through the respective communication links.

10. A network access device comprising:
  a processor; and
  a storage medium for tangibly storing thereon program logic for execution by the processor, the stored program logic comprising:
    logic, executed by the processor, for receiving to-be-transmitted data over a bonded network port, the bonded network port including a plurality of physical network ports,
    logic, executed by the processor, for determining whether the to-be-transmitted data comprises target data to be broadcast,
    logic, executed by the processor, for transmitting the target data to a plurality of network connection management devices coupled to the network access device if the to-be-transmitted data comprises target data to be broadcast by transmitting the target data on a plurality of the physical network ports of the network access device, each port of the physical network ports coupled to a corresponding switch, and
    logic, executed by the processor, for selecting a physical network port from the plurality of physical network ports based on a hash rule if the to-be-transmitted data does not comprise target data to be broadcast, and transmitting the to-be-transmitted data to a target network connection management device using the physical network port.

11. The network access device of claim 10, the logic for identifying that to-be-transmitted data comprises target data to be broadcast comprising logic, executed by the processor, for identifying whether a packet type of the to-be-transmitted data matches a pre-determined packet type.

12. The network access device of claim 10, the logic for identifying that to-be-transmitted data comprises target data to be broadcast comprising logic, executed by the processor, for identifying that the to-be-transmitted data includes network configuration information.

13. The network access device of claim 12, the network configuration information comprising a mapping relationship between a network address of a network device and a physical address of the network device.

14. The network access device of claim 12, the logic for identifying that to-be-transmitted data comprises target data to be broadcast comprising logic, executed by the processor, for identifying that the to-be-transmitted data matches a data format of target data associated with network configuration information.

15. The network access device of claim 10, the logic for identifying and transmitting being performed by a kernel of the network access device or being performed by a network interface card of the network access device.

16. The network access device of claim 10, the stored program logic further comprising:
  logic, executed by the processor, for monitoring connection states between the network access device and the plurality of network connection management devices; and
  logic, executed by the processor, for retransmitting the target data in response to determining that a connection between the network access device and a network connection management device is restored.

17. The network access device of claim 10, the logic for transmitting the target data to a plurality of network connection management devices connected to the network access device comprising logic, executed by the processor, for transmitting the target data on all of the plurality of physical network ports of the bond port.

18. The network access device of claim 10, the logic for transmitting the target data further comprising:
  logic, executed by the processor, for establishing direct communication links with each of the plurality of network connection management devices, and
  logic, executed by the processor, for transmitting the target data to each of the plurality of network connection management devices through the respective communication links.

* * * * *